April 3, 1962 J. F. KLAPPROTH 3,028,121
THRUST AUGMENTING MEANS FOR AIRCRAFT
Filed Nov. 27, 1959
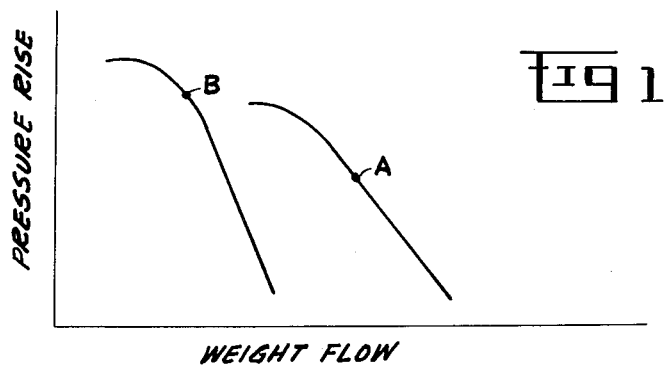
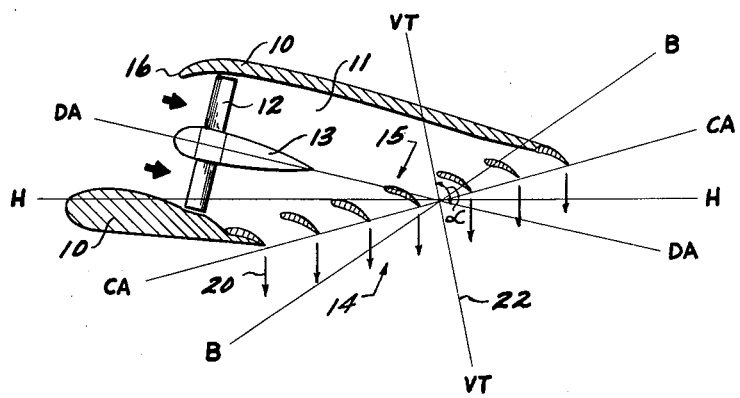
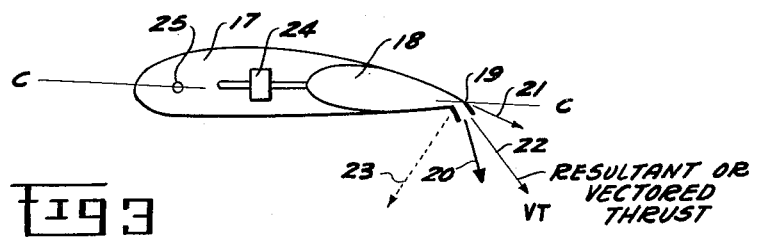
INVENTOR.
JOHN F. KLAPPROTH
BY
ATTORNEY—

United States Patent Office

3,028,121
Patented Apr. 3, 1962

1

3,028,121
THRUST AUGMENTING MEANS FOR AIRCRAFT
John F. Klapproth, Cincinnati, Ohio, assignor to General Electric Company, a corporation of New York
Filed Nov. 27, 1959, Ser. No. 855,915
4 Claims. (Cl. 244—23)

The present invention relates to a thrust augmenting means and, more particularly, to a thrust augmenting means particularly adapted for and suitable for VTOL and STOL aircraft.

In the vertical take-off and landing—VTOL and short take-off and landing—STOL aircraft of the present era, one approach is to move large quantities of low pressure air in order to obtain vertical lift. The term VTOL as used in the specification and claims is intended to cover both VTOL and STOL applications. A number of arrangements have been tried, and have proven successful such as large wing or fuselage mounted fans vertically aligned, or horizontal fuselage or wing mounted fans in combination with slats or louvers to direct large quantities of low pressure air downward and produce an upward thrust on the vehicle. Horizontal arrangements may employ highly cambered airfoils as louvers in order to turn the air downwardly. Such louvers are normally arranged in a cascade which is similar in appearance to a Venetian blind. An alternate method is to use tandem or sequentially arranged sets of louvers so that each set of louvers turns the air a little more in the downward direction.

Another means of accomplishing the turning is by the use of diverter valves in air streams which consist of high pressure air and relatively low amounts of flow. A third possibility is to orient the aircraft in a vertical position as employed in tail sitter type aircraft. Still a fourth arrangement is the tilt engine or tilt wing kind of device which is well known.

One of the accepted VTOL systems is the aforementioned airfoil-cascade arrangement with a high turning angle in order to obtain a large vertical component of force during takeoff. The limitations in such an arrangement are the losses which are associated with the cruise operation where no turning of the flow is desired but the presence of the louvers or cascades introduces losses. The use of variable geometry to minimize losses during cruise introduces complexities to the system. In addition, a limitation exists on the amount of turning that can be accomplished with good efficiency. In many VTOL vehicles it is necessary to turn the air in the order of 90 degrees and this is normally more than a good cascade can do efficiently without introducing undesirable losses.

A further disadvantage generally associated with these arrangements is an increase in back pressure on the fan during take-off. This restricts the operating efficiency of the fan system as a whole by forcing the fan to operate far from its design cruise condition. This difficulty is only partially overcome by use of variable pitch fans.

By the use of high turning, efficient cascades or louvers which diffuse as well as turn the flow, the horizontal fan with louver-cascade arrangement offers definite advantages. If, in addition, the losses due to the louvers are held to low values during cruise, the system becomes even more attractive.

The main object of the present invention is to provide a thrust augmenting means for VTOL systems which permits the use of cascades with high turning angles at higher efficiency than heretofore practical.

A second object is to provide such a means which permits operation of the fan close to the cruise condition in the vertical take-off part of the mission.

Still another object is to provide such a means wherein the orientation of the cascades is so arranged that diffusion or deceleration of the flow through the cascades is obtained during vertical take-off operation and a diffusing cascade is attained.

Briefly stated, my invention provides a thrust augmenting means for use in a VTOL aircraft which uses a cascade of airfoils in the outlet of the air duct to turn the flow in a downward direction and, by proper orientation of the cascade axis in relation to the duct axis and the vectored thrust obtains diffusion or deceleration of the flow behind the ducted fan, thereby permitting the fan to operate nearer the cruise condition substantially at all times. The particularly oriented cascade is called a diffusing cascade. Furthermore, the system permits use of airfoils having relatively little camber in comparison with the turning accomplished.

While the specification concludes with claims particularly pointing out and distinctly claiming the subject matter which I regard as my invention, it is believed the invention will be better understood from the following description taken in connection with the accompanying drawing in which:

FIGURE 1 is a plot showing the operating characteristics of fans and propellers;

FIGURE 2 is a diagrammatic partial cross-sectional view showing the orientation of the cascades in a VTOL or STOL system; and FIGURE 3 is a cross-sectional view of a single airfoil of the type used in the system shown in FIGURE 2.

It should be appreciated that the thrust agumenting means, to be described herein, may have application other than the particular preferred embodiment illustrated in the VTOL aircraft and is useful wherever fluid quantities are required to be diverted efficiently over large angles. However, the invention is particularly applicable to the VTOL field and it is in this area in which it will be particularly described.

The combination of fan and thrust vectoring system to be described permits the main cruise system to provide more lift than would exist from simply vectoring the fan thrust which would normally be attained during take-off operation.

Referring first to FIGURE 1, there is shown a plot of the operating characteristics of typical fans and propellers. If the fan and thrust vectoring system can be made to operate efficiently at a high flow-low pressure condition A of FIGURE 1 (equivalent to the cruise condition), the lifting force available is larger than if the same horsepower is used for low flow-high pressure operation B of FIGURE 1 (corresponding to conventional take-off condition). A variable pitch is presumed in the example of FIGURE 1. Fixed geometry operation would be even less desirable. Thus, it is desirable to provide a system which will operate close to A at take-off as well as cruise.

Referring next to FIGURE 2, there is diagrammatically shown the arrangement of the instant invention that permits operation close to A in FIGURE 1 at all times, whether in the vertical rising position or in cruise position. In FIGURE 2, 10 may be part of the body of a VTOL vehicle and may be a wing or representative of the fuselage of such a vehicle. It will be appreciated that the remaining portions of the vehicle are not shown since FIGURE 2 sufficiently illustrates the inventive concept herein. Body 10 has a relatively large through duct 11 to permit passage of large quantities of low pressure air therethrough from left to right as shown in FIGURE 2. In order to move the high flow, low pressure air through duct 11, a suitable fan or propeller 12 is supplied in the duct and mounted on a central supporting member 13 and driven in any suitable manner not shown. A suitable outlet, generally indicated at 14, is supplied at the aft end of the duct for directing the high flow, low pressure air, in the desired direction for vertical lift or cruise operation. In order to move the air in the desired direction, a cascade of airfoils generally indicated at 15, is supplied in the outlet of the duct. It should be noted that the vertical axis on the drawing represents vertical movement of the structure shown in FIGURE 2 and the horizontal axis of the drawing represents the normal cruise operation of the FIGURE 2 structure. As a fuselage, the body 10 is designed to move through the surrounding air in generally a horizontal direction in the normal fashion. To this end, the duct 11, which may be generally longitudinal, is provided through the body as described since it is intended that the body move by jet reaction. Such reaction is provided by the flow of air through duct 11 which air is taken aboard at an inlet 16 preferably directed forward but not limited to a forward direction, and is exhausted in a generally horizontal direction through outlet 14. If vehicle operation is desired at speeds above the cruise condition, it is desirable to use either a variable area discharge on the fan or vary the pitch of the fan blades by complex arrangements. It can be seen that the cascade described permits the variable area discharge, as seen in FIGURE 3, by rotation of the airfoils about a pivot 25 by any suitable means not shown. At such speeds, the airfoals in the cascade will be rotated from the position shown in FIGURE 2 to a more horizontal position as shown in FIGURE 3.

It can be seen that if the exhaust fluid from outlet 14 can be efficiently diverted into a vertical direction, then a vertical force may be obtained on the body 10. As stated above, various cascades have been previously provided for this purpose. However, it is desired to avoid large turning, highly cambered airfoils because of their inefficiency at the high turning angles as well as their undesirable high drag during the horizontal or cruise conditions. In order to accomplish the same purpose, I prefer the use of high pressure jets to increase the turning effectiveness of the cascade, permitting the exhaust to be turned with relatively low cambered blades and with a minimum of variable geometry hardware. In order to accomplish this, airfoil 17, as shown in FIGURE 3, is provided with fluid supply means 18 designed to supply high pressure air to the airfoil. Preferably, each airfoil in the cascade will be so provided. High pressure air which is air at a pressure higher than the duct air pressure is introduced into means 18 by any suitable method, not shown, and is exhausted from means 18 through a slot or nozzle 19 in the trailing surface in a downward and preferably rearward direction as represented by line 20. Slot or nozzle 19 may be oriented transversely to direct the high pressure air or fluid closer to a vertical direction than the exhaust of the lower pressure surrounding air as shown by the arrow 21. The presence of the high pressure jet at arrow 20, induces the lower pressure air 21 into the vertical direction as shown by the arrow 22. The arrow 22 represents the resultant of these two flows and is called the vectored thrust. Thus, during vertical operation, high pressure fluid such as air is directed out slot or nozzle 19 to induce the lower pressure exhaust fluid 21 into a vertical direction as represented at 22. During the normal or cruise operation, suitable selective control means, such as a valve diagrammatically shown at 24, may control the supply of the high pressure fluid such as air to means 18 to cut it off if desired.

It can be seen that the use of the aerodynamic boundary as represented by the arrow 20, does not require any mechanical hardware to turn the flow and yet serves the same purpose as a mechanically turnable airfoil would in directing the lower pressure exhaust. Thus, each individual airfoil in the cascade 15 in FIGURE 2 is preferably constructed in the manner just described for FIGURE 3. The direction of the resultant vectored thrust 22 is shown as line VT—VT on FIGURE 2.

Referring again to FIGURE 3, it can be seen that the airfoil 17 is of low camber as shown by the camber line C—C and that the vectored thrust is directed below the line C—C. Thus, the vectored thrust exhausts at an angle to the camber line and below it at each individual airfoil.

In order to provide diffusion or decleration of the flow behind the ducted fan or propeller 12 and thus provide for the desirable operating characteristics as described in connection with FIGURE 1, so that vertical and cruise condition takes place at A on the curve, it is necessary to orient the cascade axis, shown as line CA—CA in FIGURE 2, in the exit plane in a particular position. The cascade axis may be defined as a line through the trailing or leading edges of all the individual airfoils in the cascade. As shown in FIGURE 2, CA—CA is shown as the line through the trailing edge of the individual airfoils. The duct axis through the center of duct 11 is shown as line DA—DA. For a straight-through duct, this axis will fall as shown. It should be appreciated that the duct 11 may be curved or may be other than straight-through as shown, in which case the duct axis DA would be defined as the tangent to the duct axis at the point where the cascade is being inserted. As shown in FIGURE 2, this tangent obviously falls on DA—DA. The horizontal axis is represented by line H—H as shown on FIGURE 2. The bisector of the angle α between VT—VT and DA—DA is shown as line B—B. With this arrangement of axes as described, the orientation of the cascade axis CA—CA can be seen to fall between the bisector B—B and the duct axis DA—DA and preferably lies above the horizontal axis H—H.

With this orientation of the cascade axis and with high turning efficiency the diffusion or deceleration of the main air flow is obtained to permit operation close to A as shown in FIGURE 1. Also, with this arrangement of a diffusing cascade and by the use of high pressure jets the individual airfoils may have relatively little camber as shown in FIGURE 3, permitting efficient operation during cruise condition. It is to be noted in FIGURE 3 that the jet exhaust 20 is directed downwardly in a quadrant formed between the camber line C—C and a line normal to the camber line. It should be appreciated that this jet exhaust could be directed more forwardly, as shown by dotted line 23 if desired, and still obtain the desired vectored thrust 22 although it would then be moved into a more vertical direction. Thus, the jet exhaust 20 may fall in the 180 degrees below the camber line C—C. Also, the direction of the jet exhaust 20 need not be the same for all blades 15 in the cascade.

While there has been described a preferred form of the invention, obviously many modifications and variations of the present invention are possible in the light of the above teachings. It is therefore to be understood that within the scope of the appended claims, the invention may be practiced otherwise than as specifically described.

I claim:

1. A VTOL vehicle having a generally horizontal duct therethrough and means to move large quantities of low pressure air through said duct, thrust augmenting means comprising, a cascade of airfoils at the duct exit for directing the airflow therefrom, at least some of the airfoils having a nozzle formed in the trailing surface to discharge higher pressure air from the airfoil to induce a resultant downward airflow with said duct air, said airfoils being aligned so that the cascade axis lies between the duct axis and the bisector of the angle formed by the duct axis and the resultant airflow.

2. A VTOL vehicle having a generally horizontal duct therethrough exiting out a lower rear surface of the vehicle, means to move large quantities of low pressure air through said duct, thrust augmenting means comprising, a cascade of airfoils at the duct exit for directing the flow therefrom, each airfoil having a nozzle formed in the trailing surface to discharge higher pressure air downwardly from the airfoil to induce a resultant downward airflow with said duct air, said airfoils being aligned so that the cascade axis lies between the duct axis and the bisector of the angle formed by the duct axis and the resultant airflow and also lies above the horizontal axis.

3. A VTOL vehicle having a generally horizontal duct therethrough exiting out a lower rear surface of the vehicle, means in said duct to move large quantities of low pressure air therethrough, thrust augmenting means comprising, a cascade of airfoils in the duct exit for directing the flow therefrom, each airfoil having a nozzle formed in the trailing surface to discharge higher pressure air rearwardly and downwardly at an angle to the airfoil camber line to induce a vectored thrust, said airfoils being aligned so that the cascade axis lies between the duct axis and the bisector of the angle formed by the duct axis and the vectored thrust and also lies above the horizontal axis.

4. Thrust augmenting means for VTOL aircraft having a through duct for the movement of large quantities of low pressure air comprising, a cascade of airfoils for mounting at the duct exit for directing airflow from the duct, at least some of the airfoils having a nozzle formed in the trailing surface, means to direct higher pressure air through said nozzles for inducing a resultant downward airflow with said duct air, said airfoils being aligned in the cascade so that, when mounted in the aircraft, the cascade axis lies between the duct axis and the bisector of the angle formed by the duct axis and the resultant induced air flow.

References Cited in the file of this patent

UNITED STATES PATENTS

| | | |
|---|---|---|
| 2,396,911 | Anxionnaz et al. | Mar. 19, 1946 |
| 2,461,435 | Neuman et al. | Feb. 8, 1949 |
| 2,793,493 | Kadosch et al. | May 28, 1957 |
| 2,922,277 | Bertin | Jan. 26, 1960 |

FOREIGN PATENTS

| | | |
|---|---|---|
| 1,056,481 | Germany | Apr. 30, 1959 |